US012353018B2

(12) United States Patent
Lu (10) Patent No.: US 12,353,018 B2
(45) Date of Patent: Jul. 8, 2025

(54) LASER PROCESS FOR PROCESSING FERRULES USED IN NON- CONTACT OPTICAL CONNECTORS (71) Applicant: COMMSCOPE TECHNOLOGIES LLC, Hickory, NC (US)

(72) Inventor: Yu Lu, Eden Prairie, MN (US)

(73) Assignee: COMMSCOPE TECHNOLOGIES LLC, Hickory, NC (US)

(*) Notice: Subject to any disclaimer, the term of this patent is extended or adjusted under 35 U.S.C. 154(b) by 332 days.

(21) Appl. No.: 17/909,186

(22) PCT Filed: Mar. 2, 2021

(86) PCT No.: PCT/US2021/020515
§ 371 (c)(1),
(2) Date: Sep. 2, 2022

(87) PCT Pub. No.: WO2021/178433
PCT Pub. Date: Sep. 10, 2021

(65) Prior Publication Data
US 2023/0092201 A1 Mar. 23, 2023

Related U.S. Application Data (60) Provisional application No. 62/984,399, filed on Mar. 3, 2020.

(51) Int. Cl.
G02B 6/36 (2006.01)
G02B 6/38 (2006.01)
(52) U.S. Cl.
CPC ......... *G02B 6/3688* (2013.01); *G02B 6/3847* (2013.01); *G02B 6/3885* (2013.01)

(58) Field of Classification Search
CPC ... G02B 6/3688; G02B 6/3847; G02B 6/3885
See application file for complete search history.

(56) References Cited

U.S. PATENT DOCUMENTS

| 6,719,927 B2* | 4/2004 | Sakurai | G02B 6/3865 249/176 |
| 8,740,474 B2 | 6/2014 | Lu | |
| 10,401,568 B2 | 9/2019 | Lu | |
| 10,451,815 B2* | 10/2019 | Flaig | H01J 37/32009 |
| 10,545,294 B1* | 1/2020 | Jian | G02B 6/3885 |
| 2001/0007603 A1* | 7/2001 | Sakurai | G02B 6/3865 385/60 |
| 2005/0061995 A1 | 3/2005 | Vink et al. | |
| 2009/0041412 A1 | 2/2009 | Danley et al. | |
| 2016/0054523 A1 | 2/2016 | Lu | |

(Continued)

OTHER PUBLICATIONS

International Search Report and Written Opinion of the International Searching Authority for International Patent Application No. PCT/US2021/020515 mailed Jun. 24, 2021, 8 pages.

*Primary Examiner* — Peter Radkowski
(74) *Attorney, Agent, or Firm* — MERCHANT & GOULD P.C.

(57) ABSTRACT

A method for processing a ferrule for a fiber optic connector is disclosed herein. The ferrule supports an optical fiber. The method involves laser processing a distal end of the ferrule to expand at least a portion of the ferrule to cause recession of an end of the optical fiber relative to the expanded portion of the ferrule.

20 Claims, 12 Drawing Sheets (56) References Cited

U.S. PATENT DOCUMENTS

| | | |
|---|---|---|
| 2016/0252682 A1 | 9/2016 | Watte et al. |
| 2018/0156986 A1 | 6/2018 | Lu et al. |
| 2018/0329156 A1* | 11/2018 | Flaig ................. H01J 37/32009 |
| 2019/0154927 A1* | 5/2019 | Shimakawa ........... G02B 6/403 |

* cited by examiner

LASER PROCESS FOR PROCESSING FERRULES USED IN NON- CONTACT OPTICAL CONNECTORS

CROSS-REFERENCE TO RELATED APPLICATION

This application is a National Stage Application of PCT/US2021/020515, filed on Mar. 2, 2021, which claims the benefit of U.S. Patent Application Ser. No. 62/984,399, filed on Mar. 3, 2020, the disclosures of which are incorporated herein by reference in its their entireties. To the extent appropriate, a claim of priority is made to each of the above disclosed applications.

TECHNICAL FIELD

The present disclosure relates generally to methods for processing components of fiber optic connectors. More particularly, the present disclosure relates to methods for processing non-contact multi-fiber ferrules used in multi-fiber fiber optic connectors.

BACKGROUND

Fiber optic communication systems are becoming prevalent in part because service providers want to deliver high band width communication capabilities (e.g., data and voice) to customers. Fiber optic communication systems employ a network of fiber optic cables to transmit large volumes of data and voice signals over relatively long distances. Fiber optic connectors are an important part of most fiber optic communication systems. Fiber optic connectors allow optical fibers to be quickly optically connected without requiring a splice. Fiber optic connectors can include single fiber connectors and multi-fiber connectors.

A typical multi-fiber fiber optic connector includes a ferrule assembly supported at a distal end of a connector housing. The ferrule assembly can include a multi-fiber ferrule mounted in a hub. A spring is used to bias the ferrule assembly in a distal direction relative to the connector housing. The multi-fiber ferrule functions to support the end portions of multiple optical fibers. The multi-fiber ferrule has a distal end face at which polished ends of the optical fibers are located. When two multi-fiber fiber optic connectors are interconnected, the distal end faces of the multi-fiber ferrules oppose and are biased toward one another by their respective springs. With the multi-fiber fiber optic connectors connected, their respective optical fibers are coaxially aligned such that the end faces of the optical fibers directly oppose one another. In this way, optical signals can be transmitted from optical fiber to optical fiber through the aligned end faces of the optical fibers.

It has been known to process multi-fiber ferrules using lasers to remove material. For example, U.S. Pat. Nos. 10,401,568 and 8,740,474 disclose processing techniques where lasers are used to move material from the end face of a ferrule.

Traditional physical contact optical connectors are designed such that the end faces of the optical fibers of the connectors directly contact one another during mating of two connectors. In contrast, non-contact optical connectors are designed such that a small air gap remains between the end faces of the aligned optical fibers of two mated optical connectors. What is needed is an efficient method for manufacturing non-contact optical connectors.

SUMMARY

The present disclosure relates generally to using a laser processing technique to process a ferrule for a non-contact fiber optic connector. In one example, the ferrule supports at least one optical fiber. In one example, a distal tip of the optical fiber is recessed with respect to at least a portion of a distal end face of the ferrule. In one example, a laser processing technique is used to recess the optical fiber with respect to a portion of the distal end face of the ferrule. In one example, the laser processing technique includes applying a laser beam to the distal end face of the ferrule causing the ferrule to expand in a distal direction relative to the distal tip of the optical fiber thereby causing the tip of the optical fiber to be recessed relative the expanded portion of the ferrule. Aspects of the present disclosure are applicable to single fiber ferrules and multi-fiber ferrules.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

DETAILED DESCRIPTION

Aspects of the present disclosure relate to a laser processing technique for processing a ferrule adapted for use in a non-contact optical connector. In certain examples, the ferrule can support at least one optical fiber. The ferrule is configured such that when the distal ends of two of the ferrules are abutted together, an air gap exists between the ends of the optical fibers supported by the ferrules. A ferrule adapted to provide this type of functionality can be referred to as a non-contact ferrule. In certain examples, the non-contact ferrule can include a multi-fiber ferrule (e.g., a multi-fiber push-on (MPO) ferrule). In certain examples, the multi-fiber ferrule can be made of a polymeric material such as polyphenylene sulfide (PPS) with glass filler.

A multi-fiber, non-contact ferrule supports a plurality optical fibers. In one example in accordance with the present disclosure, each optical fiber has a fiber end (e.g., a tip, face, etc.) slightly recessed with respect to at least a portion of an end face of the multi-fiber ferrule such that when the end faces of two of the multi-fiber ferrules are abutted together, an air gap exists between co-axially aligned fibers of the ferrules. In some examples, the fiber ends can be optionally coated with an anti-reflective coating.

Aspects of the present disclosure relate to a laser processing method for recessing an optical fiber end relative to a distal end portion of a ferrule to create a non-contact ferrule. Certain lasers such as carbon dioxide ($CO_2$) lasers and fiber lasers remove material by heating of the material. A fiber laser is a laser in which the active gain medium is an optical fiber doped with a rare earth element. A $CO_2$ laser is a molecular gas laser in which a gas mixture including carbon dioxide is used as the gain medium. For material to be removed using lasers of the type described above, the power level of the laser preferably is above a threshold power level which is high enough to cause ablation of the material. It has been determined that if the power level of the laser is below this threshold level, the material of the ferrule being laser processed expands (e.g., foams) instead of being ablated thereby increasing the height of the ferrule material at the laser application site. Aspects of the present disclosure relate to laser processing techniques for processing the end face of a ferrule to make a non-contact ferrule. In one example, the ferrule end face is processed using a laser having a power level adapted to cause expansion of a laser processed portion or portions of the ferrule. In certain examples, by laser expanding a portion or portions of the ferrule end face, an optical fiber or fibers secured within the ferrule can be recessed relative to the expanded portion or portions of the ferrule. In this way, a non-contact ferrule for use in a non-contact optical connector can be manufactured.

Figure 1:
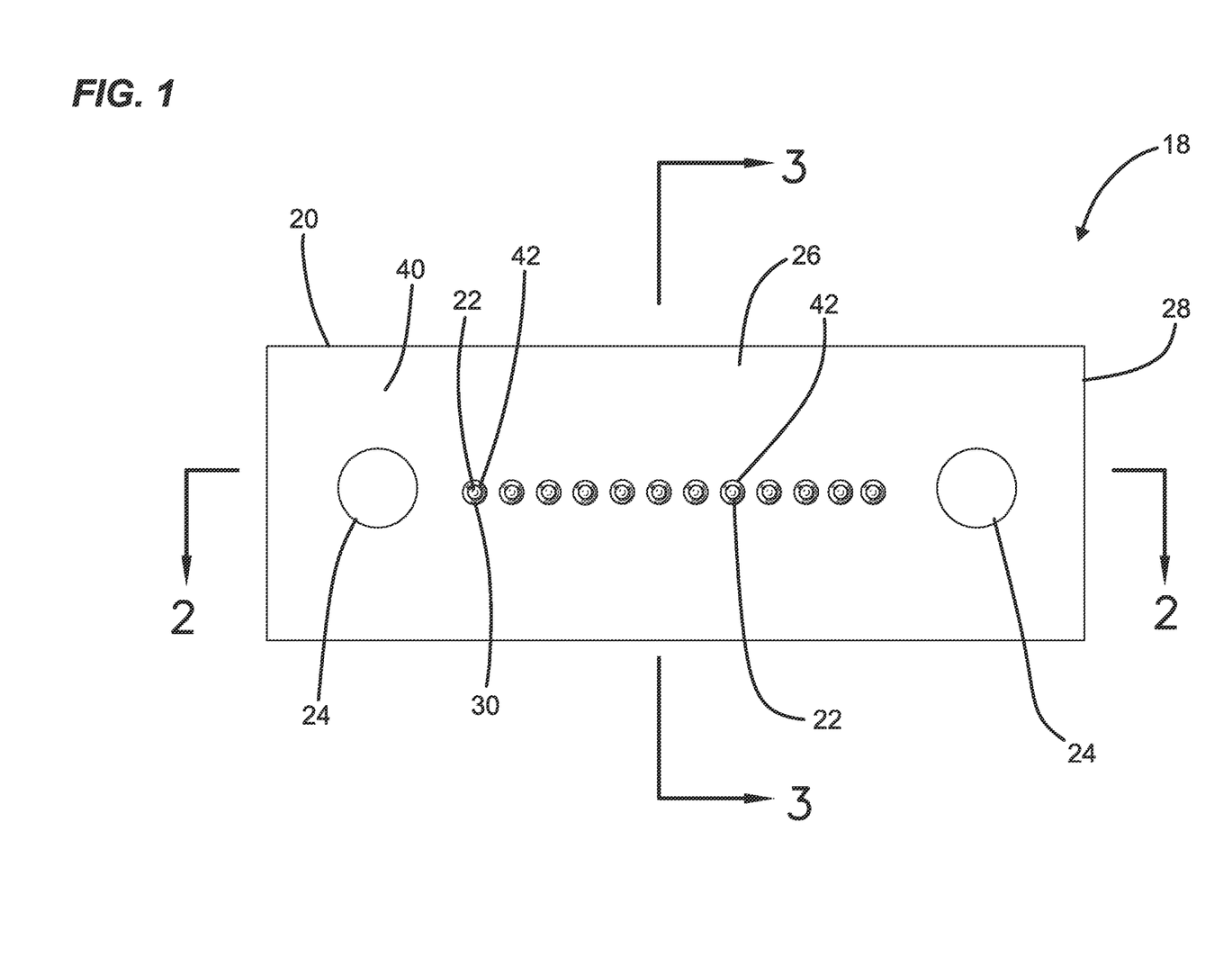
FIG. 1 is an end view of a ferrule in accordance with the principles of the present disclosure adapted for use with a non-contact optical connector.
Figure 2:
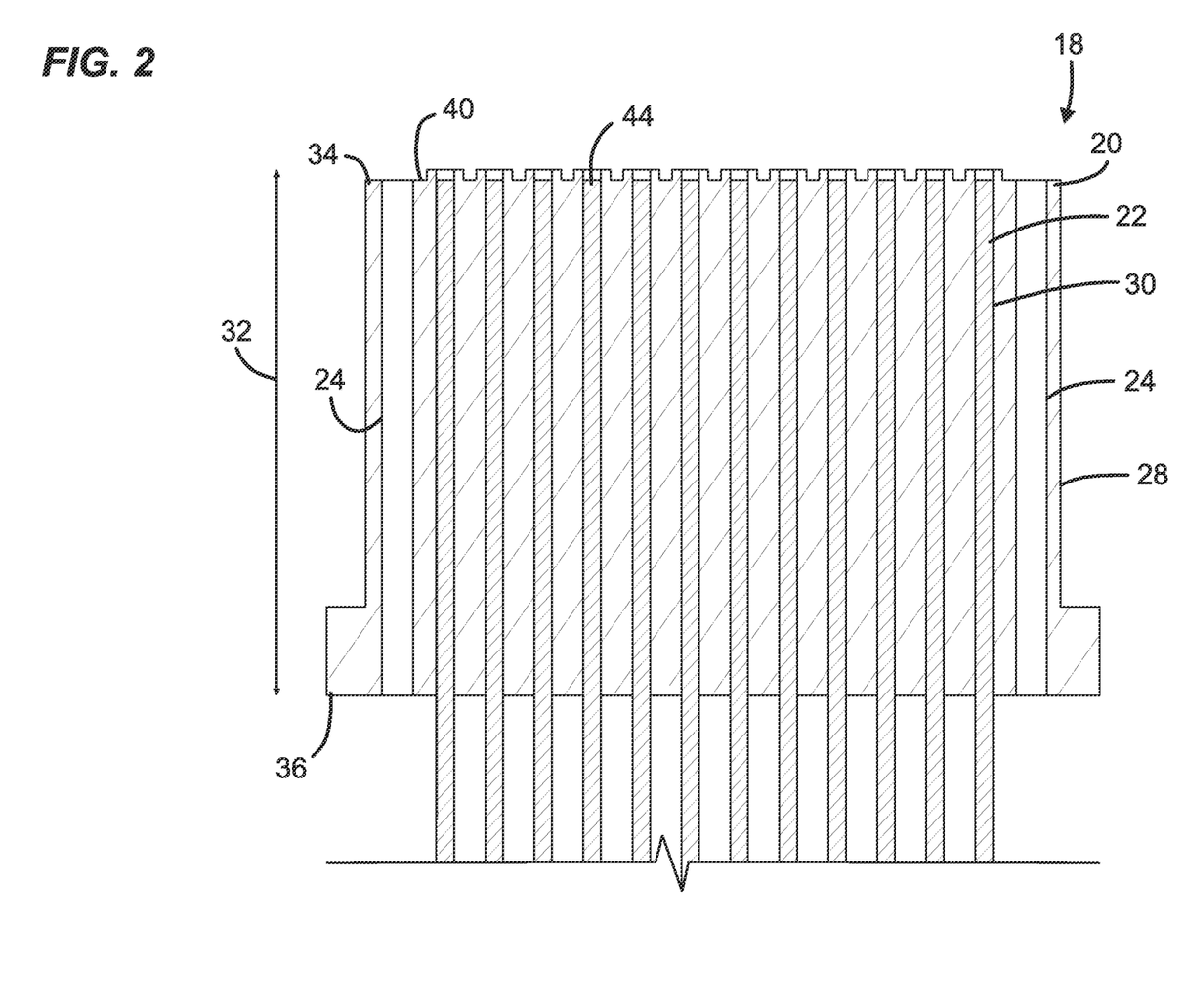
FIG. 2 is a cross-sectional view taken along section line 2-2 of FIG. 1.
Figure 3:
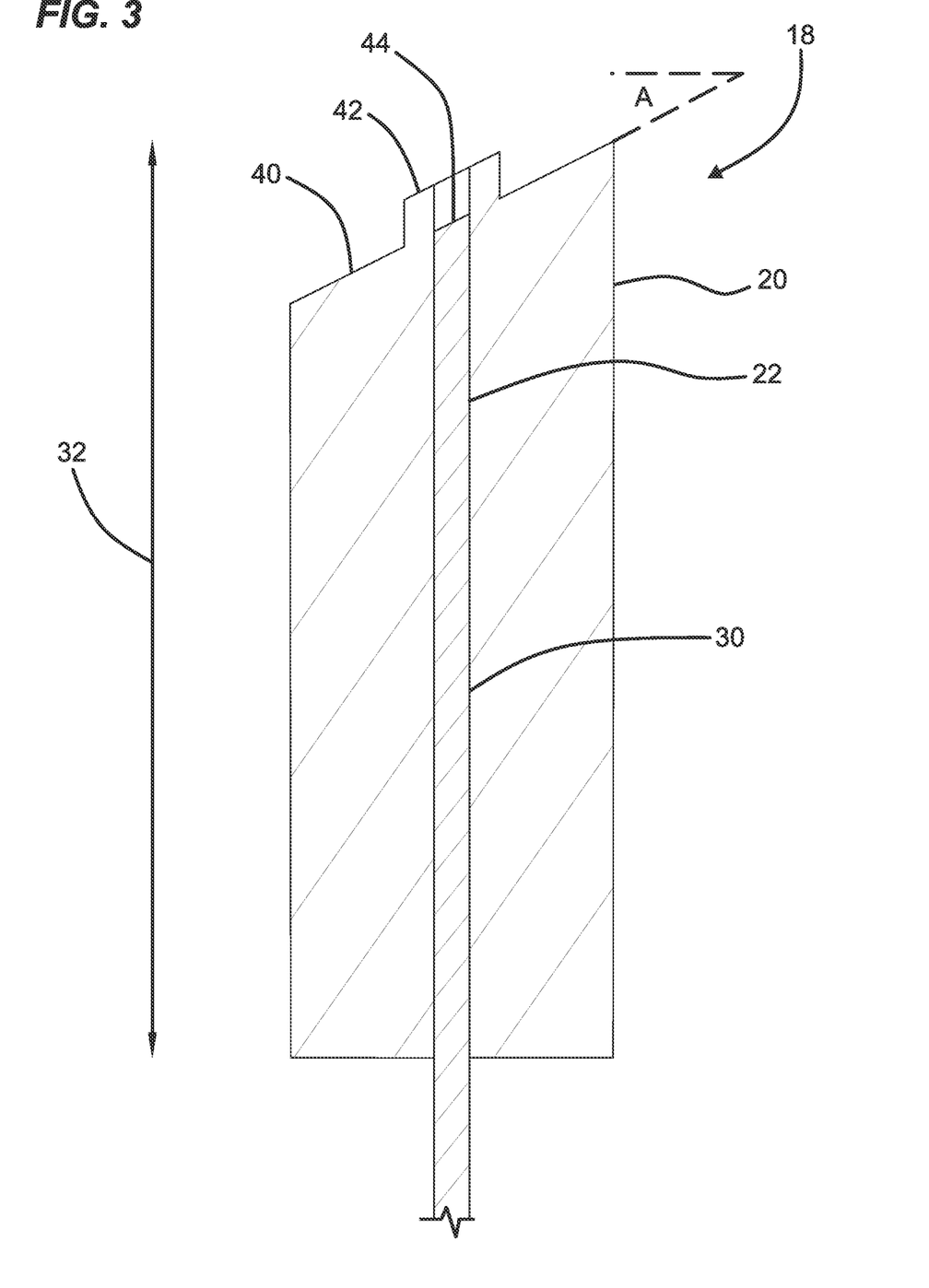
FIG. 3 is a cross-sectional view taken along section line 3-3 of FIG. 1.
Figure 4:
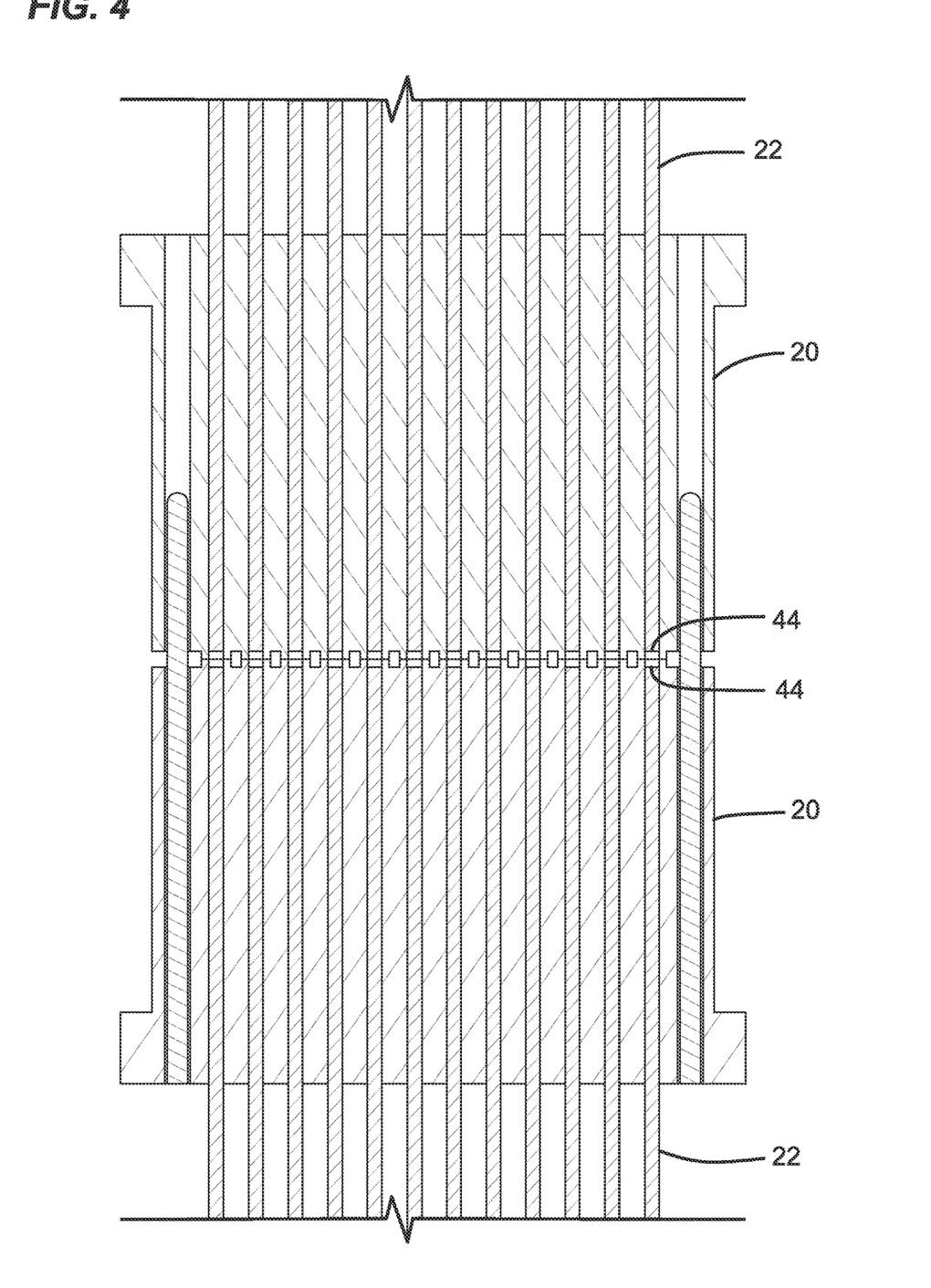
FIG. 4 is a cross-sectional view showing a male and female version of the ferrule of FIG. 1 mated together.

FIGS. 1-3 depict an example ferrule assembly 18 including a ferrule 20 and a plurality of optical fibers 22 secured within the ferrule 20. In a preferred example, the ferrule 20 is a non-contact ferrule adapted to be integrated within a non-contact fiber optic connector (e.g., see the fiber optic connector 200 at FIG. 11). While aspects of the present disclosure are applicable to single-fiber ferrules, the ferrule 20 is depicted as a multi-fiber ferrule such as an MPO ferrule. In the case of an MPO ferrule, the ferrule 20 can be manufactured of a polymeric material such as polyphenylene sulfide (PPS) including glass filler. The ferrule 20 can have a generally rectangular shape, and the optical fibers 22 can be arranged in a row of positioned between ferrule alignment openings 24. In the case of a male MPO connector, alignment pins are mounted within the alignment openings 24 and are adapted to be received within corresponding alignment openings defined by a female MPO ferrule when the male and female MPOs are mated together. In contrast, in the case of a female MPO ferrule, the alignment openings 24 remain open and are adapted to receive the alignment pins of a male MPO ferrule when the male and female MPO ferrules are mated together. FIG. 4 shows male and female versions of the ferrule 20 mated together, where the upper ferrule 20 is the female ferrule and the lower ferrule 20 is the male ferrule.

In one example, the optical fibers 22 extending through the ferrule 20 are bare fibers. Example bare optical fibers can each include a core typically having a diameter of about 10 microns, and cladding layer surrounding the core typically having an outer diameter of about 125 microns.

In certain examples, an end face 26 of the ferrule 20 can be domed. In certain examples, the end face 26 of the ferrule 20 can be angled so as to be non-perpendicular relative to the optical fibers 22. In certain examples, the end face 26 can be angled at an oblique angle A relative a reference plane normal to the axes of the optical fibers. In one example, the angle A can be 7-9 degrees, or 15-17 degrees in another example. However, aspects of the present disclosure are also applicable to ferrules having the end face 26 perpendicular relative to the optical fibers (e.g., non-angled ferrules).

Figure 5:
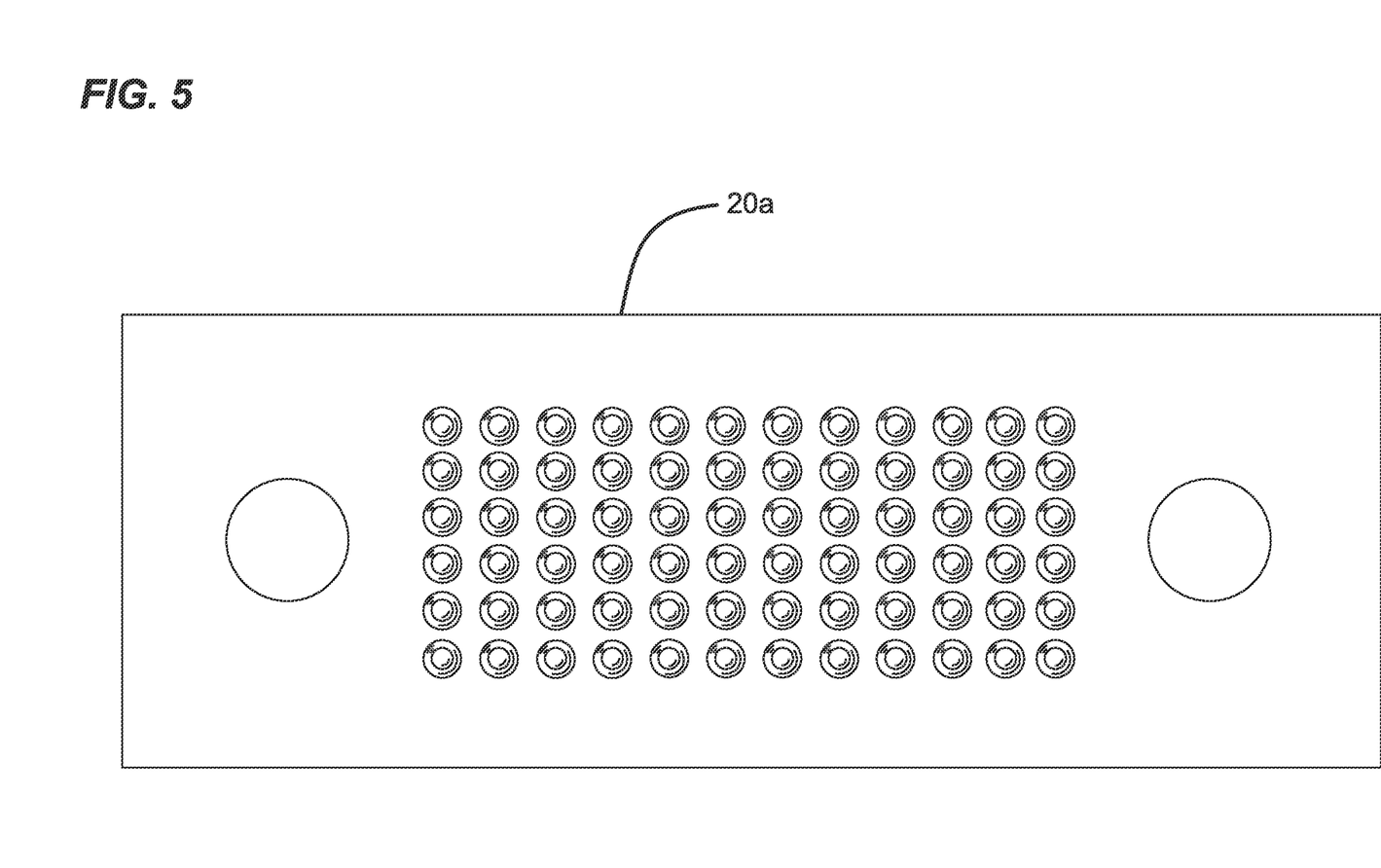
FIG. 5 is an end view of second non-contact ferrule in accordance with the principles of the present disclosure, the ferrule multiple rows of fibers and thus a higher fiber count than the ferrule of FIG. 1.

As shown at FIGS. 2 and 3, the ferrule 20 includes a ferrule body 28 defining a plurality of ferrule fiber openings 30 that preferably extend through the ferrule body 28 in a proximal-to-distal orientation 32. The optical fibers 22 are preferably secured within the fiber openings 30 by an adhesive material such as epoxy. In the depicted example, the fiber openings 30 and the optical fibers 22 are arranged in a single row between the alignment openings 24. In other examples, (such as the multi-fiber ferrule 20a of FIG. 5), multiple rows of fiber openings 30 and optical fibers 22 can be provided to increase the fiber count of the ferrule 20a. Individual distally expanded portions of the ferrule are provided for each of the fibers to provide for fiber tip recession.

Referring to FIG. 2, the ferrule body 28 includes a distal end 34 and an opposite proximal end 36. The optical fibers 22 extend through the ferrule body 28 in the proximal-to-distal orientation 32 from the proximal end 36 to the distal end 34. The distal end 34 includes the distal end face 26 which includes a main face portion 40 and a plurality of separate expanded projections 42 that project distally from the main face portion 40. The projections 42 form individual pads corresponding to each of the fibers 22. Preferably, the expanded projections 42 are positioned adjacent to the optical fibers 22 with each expanded projection 42 corresponding to one of the optical fibers 22. In the depicted example, each of the expanded projections 42 surrounds a corresponding one of the optical fibers 22. In the depicted example, the expanded projections 42 are each concentric with respect to their corresponding optical fiber 22.

Referring to FIGS. 2 and 3, the expanded projections 42 each extend distally beyond a distal tip 44 of their corresponding optical fiber 22. Thus, the distal tips 44 are recessed with respect to their corresponding expanded projections 42. In the depicted example, the distal tips 44 of the optical fibers 22 align generally with the main face portion 40 of the distal end 34 of the ferrule body 28. In certain examples, the fibers can be recessed a height/depth equal to at least 10 nanometers, or at least 100 nanometers, or at least 1 micrometer, or at least 10 micrometers, or in the range of 10 nanometers to 10 micrometers, or in the range of 10 nanometers to 5 micrometers, or in the range of 10 nanometers to 1 micrometer.

It will be appreciated that other configurations can also be used for recessing the distal tips 44 of the optical fibers 22 with respect to at least a portion or portions of the distal end 34 of the ferrule body 28. For example, in certain embodiments, the entire end face of the distal end 34, or a substantial portion of the end face of the distal end 34 of the ferrule body 28 may be expanded such that the optical fibers 22 are recessed with respect to the expanded portion or portions. In other examples, expanded projections such as elongate rails or other types of projections may be utilized to provide a portion of the distal end 34 that projects beyond the distal tips 44 of the optical fibers 22 to prevent contact between the sets of optical fibers of two mated non-contact optical connectors incorporating the non-contact ferrules.

FIG. 4 shows male and female versions of the ferrule 20 of FIGS. 1-3 aligned with respect to each other with distal ends 34 of the ferrules 20 abutting each other (as would occur when non-contact optical connectors incorporating the ferrules 20 are coupled together). As depicted, the expanded projections 42 at the distal ends 34 of the ferrules 20 contact one another to prevent contact between the aligned optical fibers 22 of the ferrules 20. Thus, axial air gaps are provided between the distal tips 44 of the aligned optical fibers 22 of the ferrules 20. In certain examples, the distal tips 44 may be coated with a coating material such as an anti-reflective coating.

Figure 6:
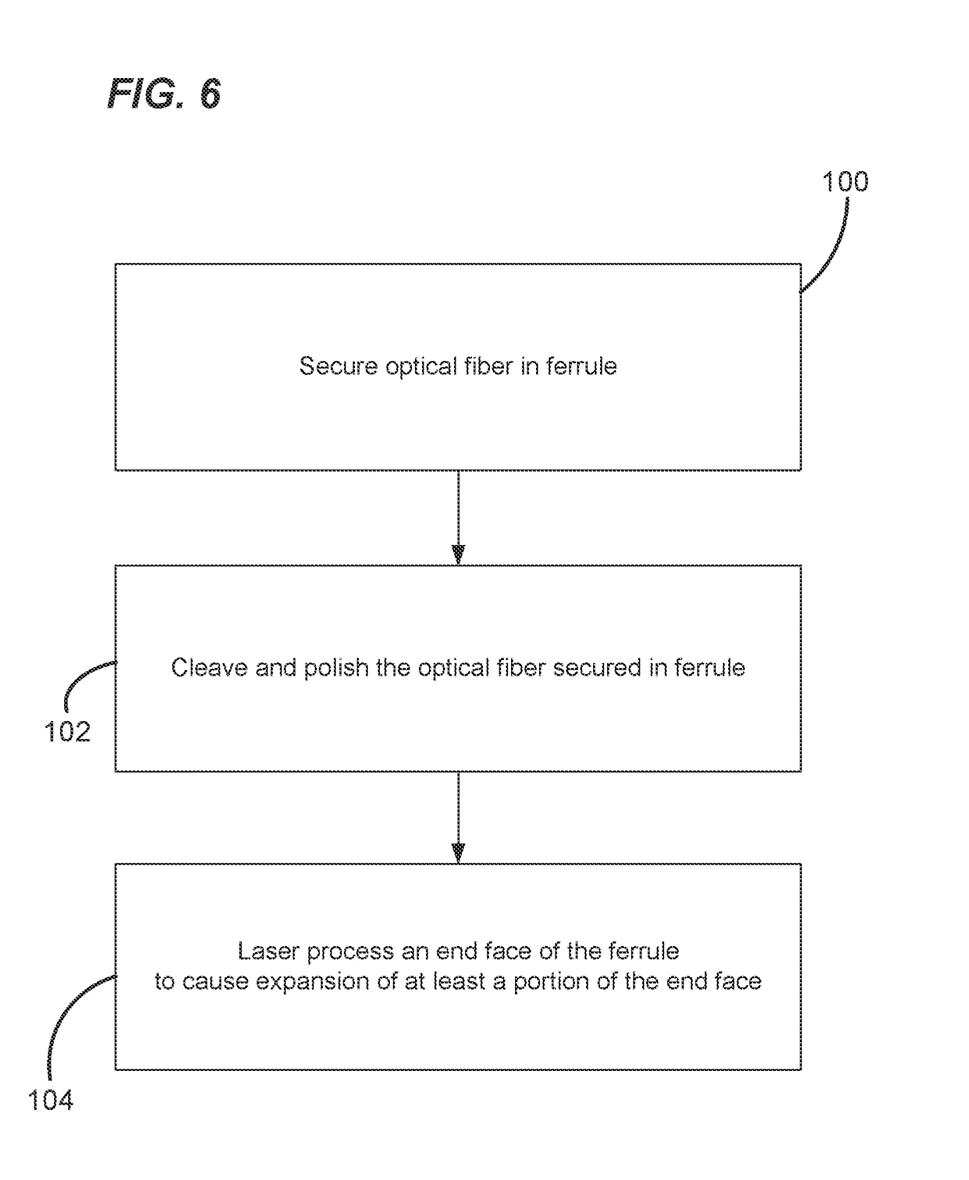
FIG. 6 is a flowchart outlining an example method in accordance with the principles of the present disclosure for processing a multi-fiber ferrule in accordance with the principles of the present disclosure.
Figure 7:
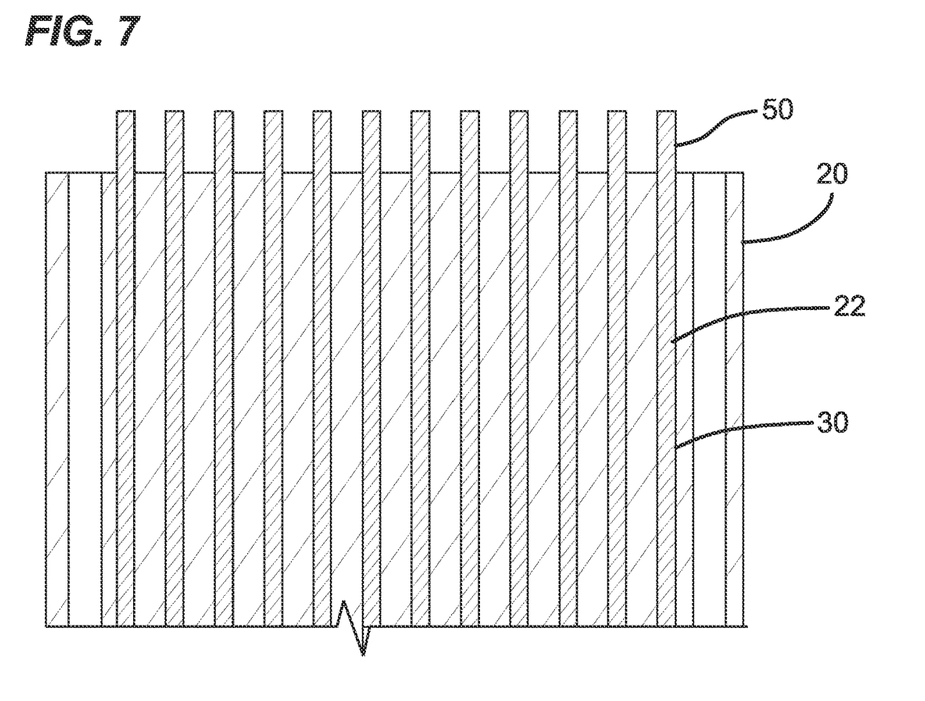
FIG. 7 is a cross-sectional view showing an example multi-fiber ferrule supporting uncleaved optical fibers.
Figure 8:
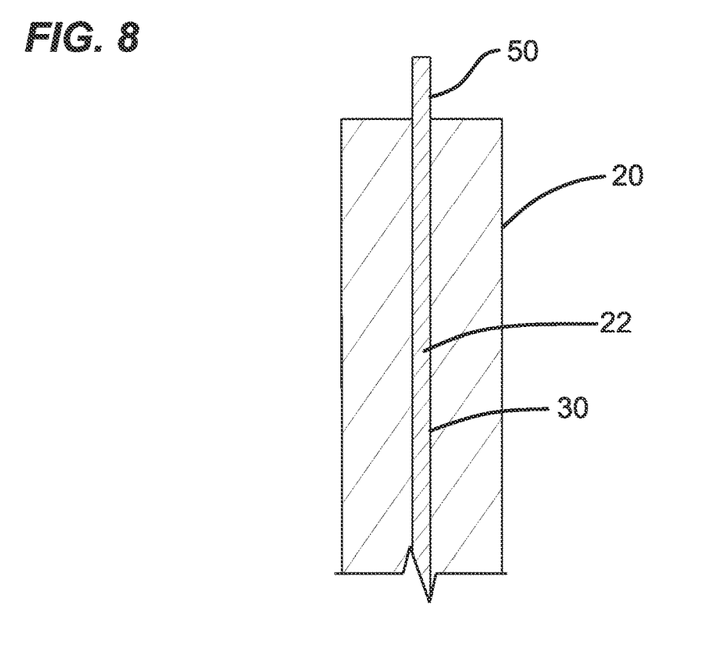
FIG. 8 is another cross-sectional view of the multi-fiber ferrule of FIG. 7 taken through one of the optical fibers along a plane perpendicular with respect to the cross-sectional plane of FIG. 7.
Figure 9:
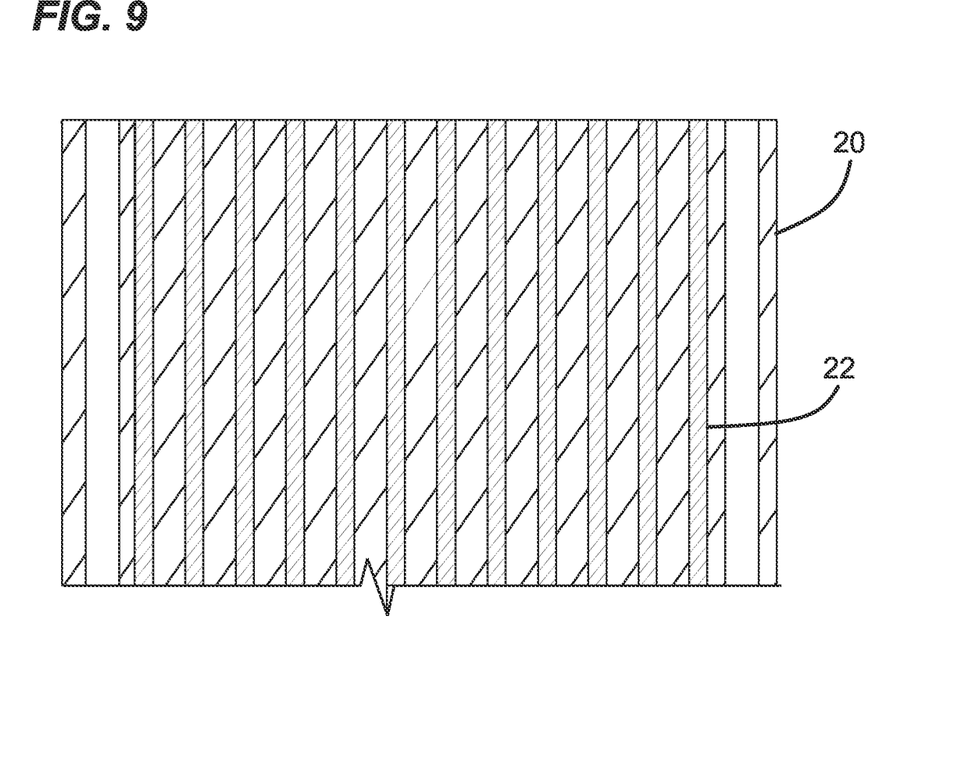
FIG. 9 is a cross-sectional view showing the multi-fiber ferrule of FIGS. 7 and 8 after the optical fibers have been cleaved and polished flush with respect to an end face of the multi-fiber ferrule.
Figure 10:
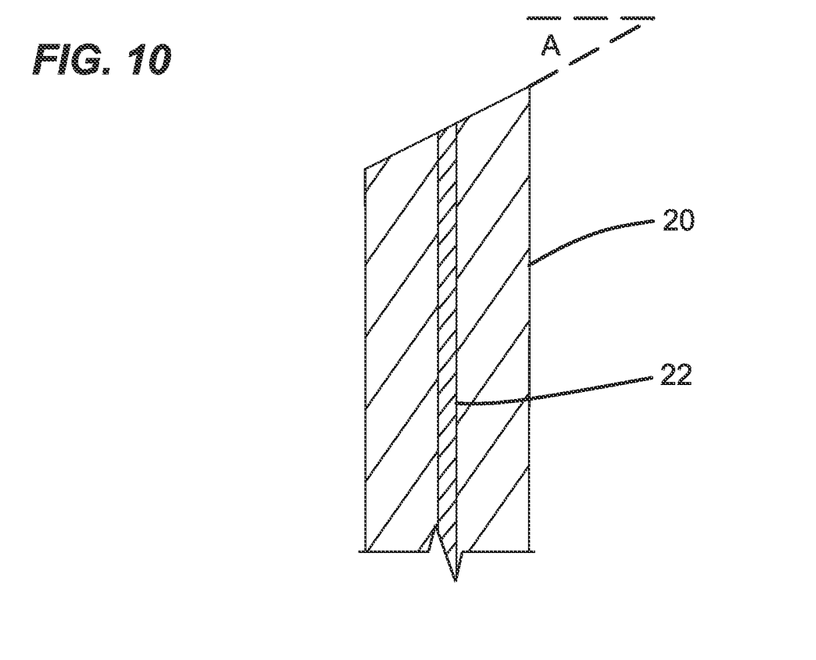
FIG. 10 is another cross-sectional view of the multi-fiber ferrule of FIG. 9 taken through one of the optical fibers along a plane perpendicular with respect to the cross-sectional plane of FIG. 9.

FIG. 6 is a flowchart outlining an example method for manufacturing non-contact ferrules in accordance with the principles of the present disclosure. Referring to the flowchart of FIG. 6, the ferrule 20 can be manufactured by initially inserting the optical fibers 22 in the fiber openings 30 and securing the optical fibers 22 in the fiber openings 30 (see step 100). In one example, the optical fibers 22 are secured within the fiber openings 30 by an adhesive material such as epoxy. In one example, the optical fibers 22 are secured within the fiber openings 30 with distal portions 50 (see FIGS. 7 and 8) that project distally beyond the distal end 34 of the ferrule body 28. Once the optical fibers 22 have been secured to the ferrule body 28 as shown at FIGS. 7 and 8, the distal portions 50 of the optical fibers 22 can be cleaved and the distal ends of the optical fibers 22 as well as the distal end of the ferrule body 28 can be polished (see step 102). The polish can be a flat polish, but preferably is an angled polish (e.g., the end surface can be polished at an oblique angle relative to perpendicular with respect to the proximal-to-distal orientation 32). As depicted at FIG. 10, the ends of the optical fibers 22 as well as the end face of the ferrule body 28 are angled at an oblique angle A with respect to a plane perpendicular with respect to the proximal-to-distal orientation 32. In certain examples, the ferrule body 28 can be pre-formed with a desired end face angle and other shaping such as a dome-shape prior to polishing. In this way, the amount the ferrule is required to be shaped by polishing can be reduced. In certain examples, after polishing, the distal ends of the optical fibers 22 are generally flush with respect to the distal end face of the ferrule body 28 as shown at FIGS. 9 and 10. But, in certain examples, the fibers may protrude or be recessed relative to the ferrule end face after polishing. In some examples, the tips of the fibers are within plus or minus 5 microns of a distal face of the ferrule after polishing.

After the cleave and polish step 102, the distal end face of the ferrule body 28 is processed using a laser to cause the distal tips 44 of the optical fibers 22 to be recessed with respect to at least a portion of the distal end of the ferrule body 28 (see step 104). To recess the distal tips 44 of the optical fibers 22 relative to the end face of the ferrule 20, a laser device is used to apply a laser beam to the distal end face of the ferrule body 28. The laser beam can be applied to the distal end face of the ferrule body 28 around the optical fibers 22. For example, the laser beam can be applied to a concentric region of the distal end face of the ferrule that encircles each of the optical fibers 22. Preferably, the power level of the laser beam applied to the distal end face is below the ablation threshold of the material of the ferrule body 28 such that the portions of the ferrule processed with the laser expand to increase the height of the ferrule near the optical fibers 22 such that the optical fibers 22 are caused to be recessed with respect to the processed portions of the ferrule. In one example, the processed portions of the ferrule correspond to the expanded projections 42 depicted in the ferrule 20 of FIGS. 1-3. The amount of laser expansion can be controlled by factors such as laser power, application duration or other factors to control the distance the fibers are recessed. In examples in which the fibers are recessed during polishing, the laser processing can be used increase the depth of fiber recession and to provide a controlled recession depth.

After laser processing, a reflective coating can optionally be applied to the recessed ends of the optical fibers 22. Preferably, the coating is applied after laser processing, but in certain examples can be applied before laser processing.

It will be appreciated that characteristics of the laser (focal spot intensity, interaction time, pulse length, power level) can be selected so that the laser beam generated by the laser effectively heats the material of the ferrule body 28 without ablating the material of the ferrule body 28. An example series of laser devices suitable for processing ferrules in a manner described above include the G3RM/HS Series 10-20 watt pulse lasers which are sold by SPI Lasers UK Ltd. of Southampton, UK. By utilizing a laser beam having a power level below the ablation threshold of the material of the ferrule, it is possible for the laser beam to selectively heat and expand the material of the ferrule in a controlled manner while not removing the ferrule material. It is believed that expansion of the ferrule material can be caused by foaming of the material that forms the ferrule body 28. Expansion of the ferrule material subjected to the laser treatment can cause the end tips of the optical fibers to be recessed with respect to the expanded portions. In certain examples, only selected portions of the ferrule end face are treated with the laser thereby generating one or more expanded projections that project distally beyond a main end face of the ferrule and also distally beyond the polished end tips of the optical fibers.

Example lasers suitable for processing the end face of the ferrule in the above manner can include carbon dioxide ($CO_2$) lasers and fiber lasers. Certain lasers may not be capable of ablating the glass of the optical fiber, such that the end of the ferrule can be laser processed without avoiding contact between the laser and the fiber during processing. In other examples, it may be desirable avoid contacting the optical fiber or fibers with the laser during laser processing of the ferrule While characteristics of the $CO_2$ or fiber laser beams have been described above, it will be appreciated that the characteristics of the laser beam used are dependent upon the material of the ferrule, material of the optical fibers, and the desired heating rate. Hence, lasers having characteristics outside of the various ranges described herein are included within the scope of the present disclosure.

One benefit of a non-contact ferrule includes added fiber protection such that less wear is placed on the optical fibers thereby enabling a longer optical connector life. Particularly with respect to multi-fiber ferrules, another advantage is that lower spring forces can be used for biasing two mated non-contact ferrules together as compared to the spring forces typically required to bias two physical contact multi-fiber connectors together. In some examples, the optical fiber tips/ends/faces are optionally coated with an anti-reflective coating.

Figure 11:
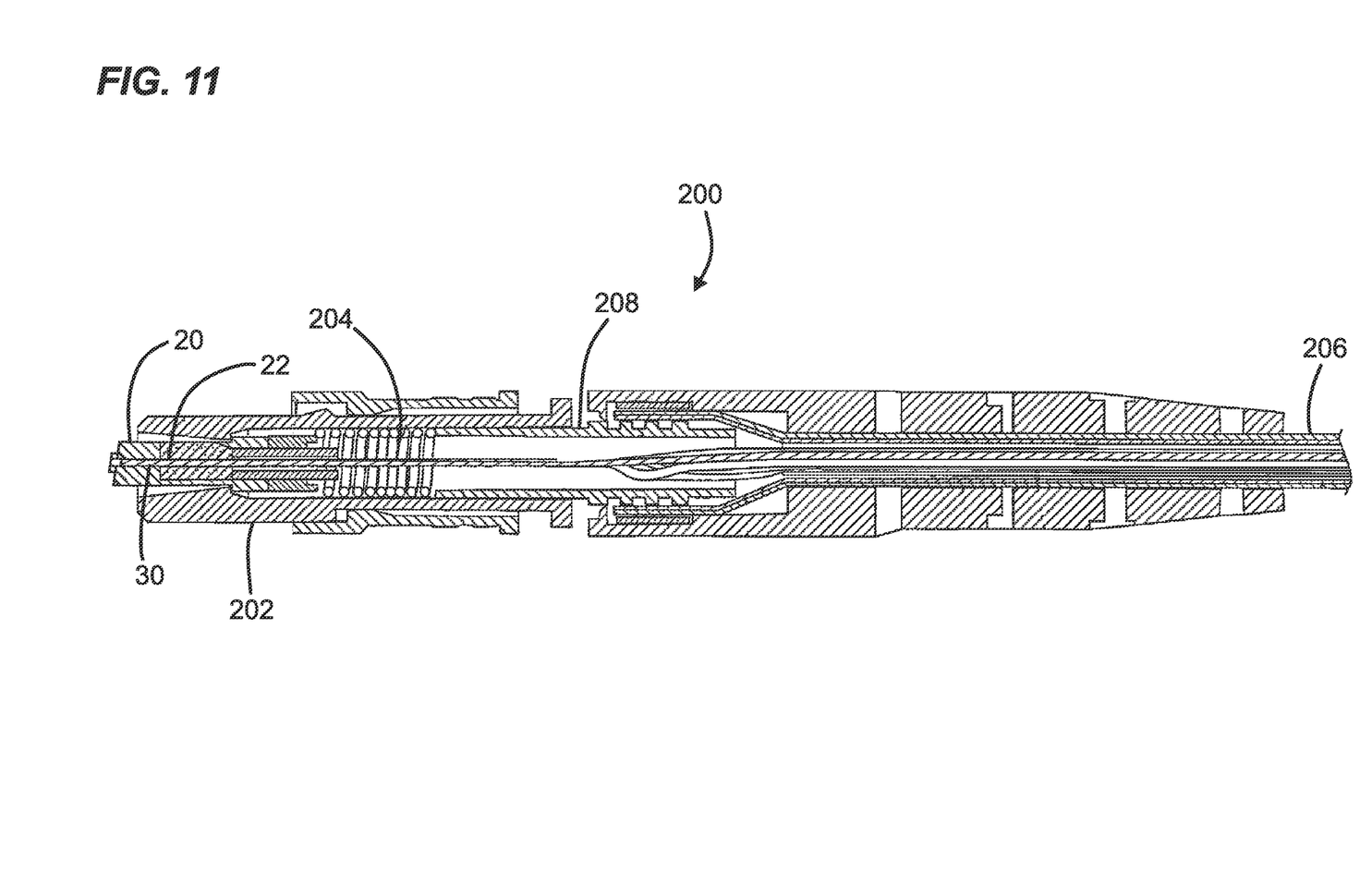
FIG. 11 is a cross-sectional view of a multi-fiber connector incorporating the ferrule of FIGS. 1-3.

Referring to FIG. 11, the fiber optic connector 200 is one example of a multi-fiber connector (e.g., an MPO connector) incorporating one of the non-contact ferrules 20 of FIGS. 1-3. The connector 200 includes a connector body 202 containing a spring 204. The ferrule 20 is mounted at a distal end of the connector body 202 and is biased in a distal direction relative to the connector body 202 by the spring 204. A cable 206 is coupled to a proximal end of the connector 200 (e.g., to a rear connector body/spring stop 208). Optical fibers 22 of the cable 206 are secured within the fiber openings 30 of the ferrule 20.

Figure 12:
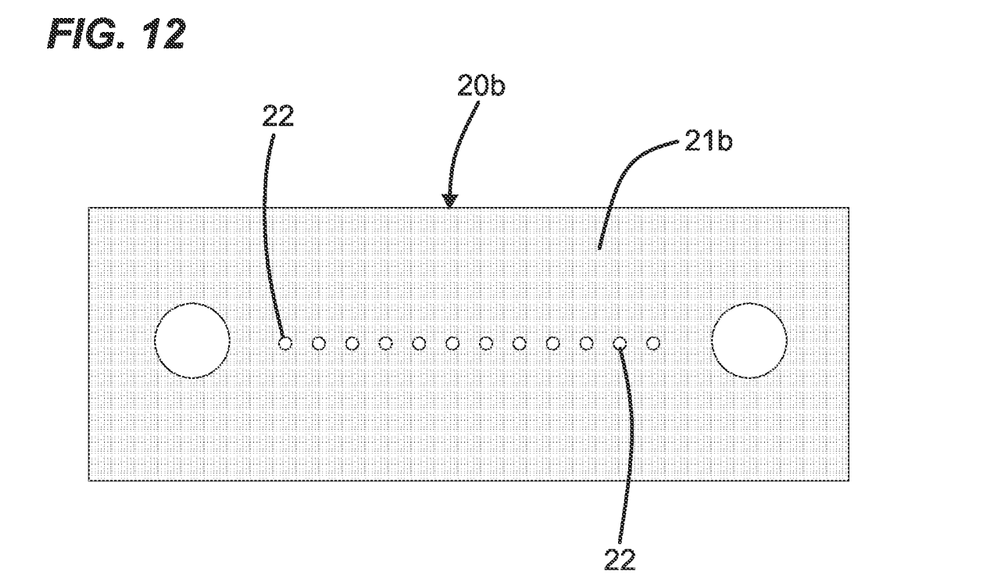
FIG. 12 is a distal end view of a third non-contact ferrule in accordance with the principles of the present disclosure.

FIG. 12 depicts a third non-contact ferrule 20b in accordance with the principles of the present disclosure. An entire distal end face 21b of the ferrule 20b has been scanned with a laser to cause distal expansion of the end face 21b relative to the optical fibers 22 such that tips of the optical fibers 22 are recessed relative to the distal end face 21b.

Figure 13:
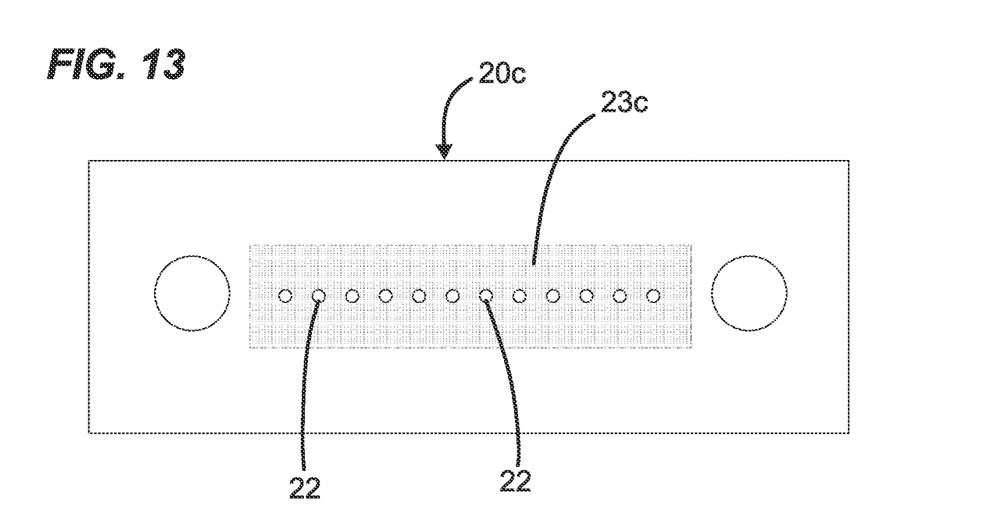
FIG. 13 is a distal end view of a fourth non-contact ferrule in accordance with the principles of the present disclosure.

FIG. 13 depicts a fourth non-contact ferrule 20c in accordance with the principles of the present disclosure. A central pad 23c encompassing all the optical fibers 22 has been scanned with a laser at the distal end of the ferrule 20c to cause distal expansion of the central pad 23c relative to the optical fibers 22 such that tips of the optical fiber 22 are recessed relative to central pad 23c. The central pad 23c is contiguous with all the optical fibers 22 and an outer boundary of the central pad 23c surrounds the row or rows of optical fibers 22.

Figure 14:
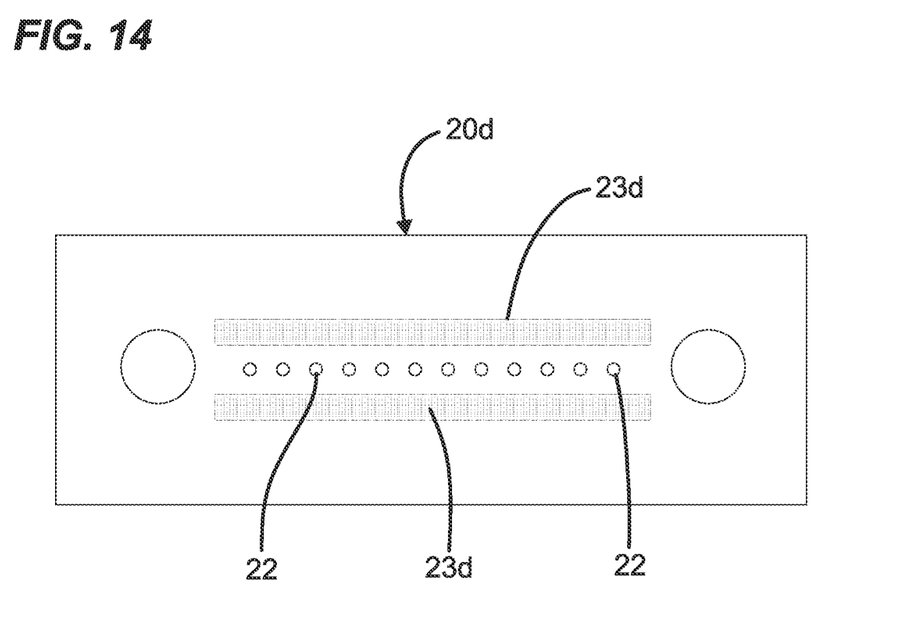
FIG. 14 is a distal end view of a fifth non-contact ferrule in accordance with the principles of the present disclosure.

FIG. 14 depicts a fifth non-contact ferrule 20d in accordance with the principles of the present disclosure. The ferrule 20d includes longitudinal rail-type pads 23d extending parallel to the row of optical fibers 22. The longitudinal rail-type pads 23d are formed by laser scanning the distal end of the ferrule 20d to cause distal expansion of the longitudinal rail-type pads 23d relative to the optical fibers 22 such that tips of the optical fiber 22 are recessed relative to the longitudinal rail-type pads 23d. The optical fibers 22 are located between the two parallel longitudinal rail-type pads 23d.

Figure 15:
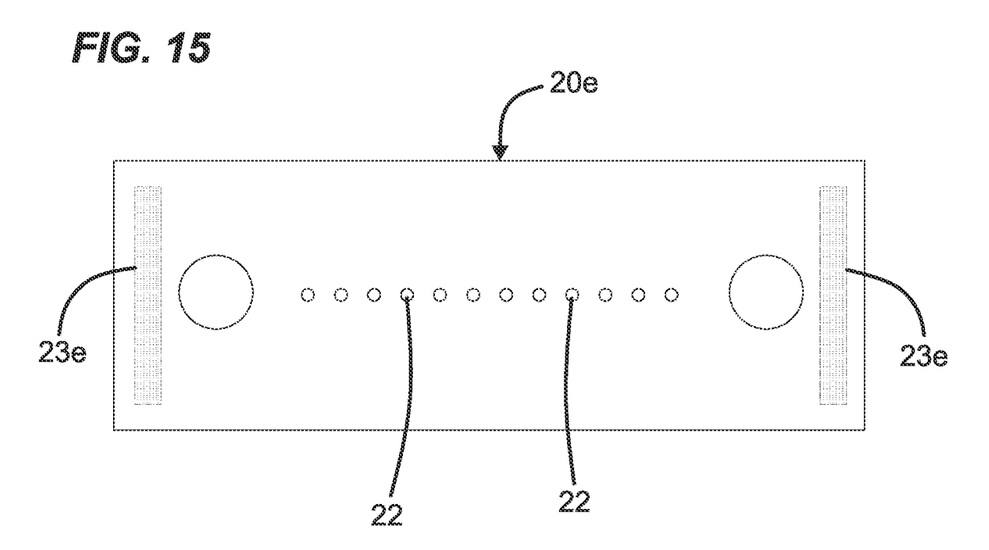
FIG. 15 is a distal end view of a sixth non-contact ferrule in accordance with the principles of the present disclosure.

FIG. 15 depicts a sixth non-contact ferrule 20e in accordance with the principles of the present disclosure. End pads 23e extending transversely to the row of optical fibers 22 are located at opposite ends of the ferrule 20e. The end pads 23e are formed by scanning the end face of the ferrule adjacent the ends of the ferrule with a laser to cause distal expansion of the end pads 23e relative to the optical fibers 22 such that tips of the optical fiber 22 are recessed relative to end pads 23e. The optical fibers 22 are located between the two parallel end pads 23e.

Figure 16:
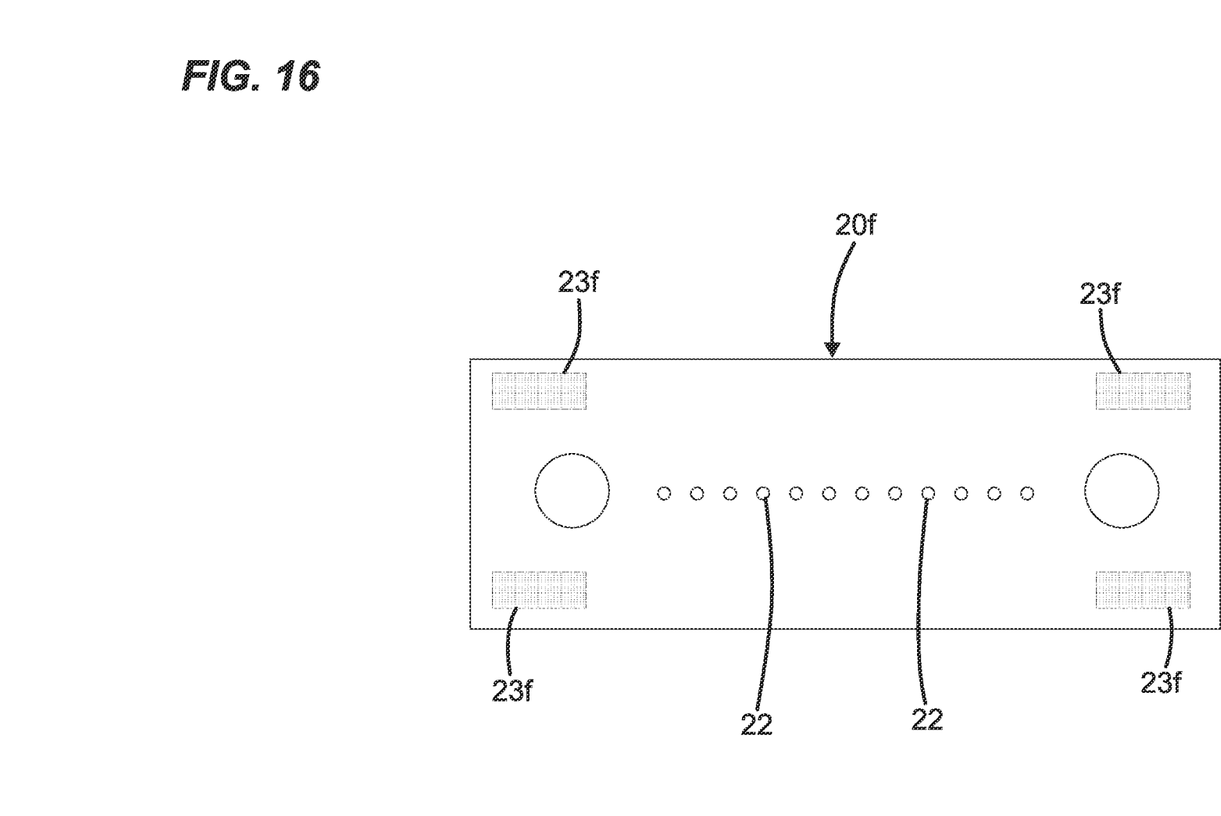
FIG. 16 is a distal end view of a seventh non-contact ferrule in accordance with the principles of the present disclosure.

FIG. 16 depicts a seventh non-contact ferrule 20f in accordance with the principles of the present disclosure. Corner pads 23f are located at the corners of the distal end face of the ferrule 20f. The corner pads 23f are formed by scanning the corner regions of the end face of the ferrule with a laser to cause distal expansion of the corner pads 23f relative to the optical fibers 22 such that tips of the optical fiber 22 are recessed relative to corner pads 23f.

From the forgoing detailed description, it will be evident that modifications and variations can be made without departing from the spirit and scope of the disclosure.

The invention claimed is:

1. A method for processing a ferrule supporting at least two optical fibers, the ferrule including a ferrule body having a distal end and a proximal end, the ferrule body also defining at least two fiber openings that extend through the ferrule body from the proximal end to the distal end, the at least two optical fibers being secured within the at least two fiber openings, the method comprising:
   laser processing the distal end of the ferrule to cause distal expansion of at least a laser processed portion of the distal end such that the at least two optical fibers are recessed with respect to the laser processed portion, wherein the laser processed portion extends between the at least two fiber openings.

2. The method of claim 1, further comprising polishing an end of the optical fiber prior to the laser processing step.

3. The method of claim 1, wherein the step of laser processing includes directing at least one laser beam from a laser at the distal end of the ferrule.

4. The method of claim 3, wherein the at least one laser beam is directed at the distal end to expand and increase height of the laser processed portion of the distal end of the ferrule.

5. The method of claim 3, wherein a power level of the at least one laser beam is below an ablation threshold of a material of the ferrule.

6. The method of claim 1, wherein the ferrule is a multi-fiber ferrule and a plurality of optical fibers are supported by the multi-fiber ferrule, and wherein an end of each of the optical fibers is recessed after laser processing.

7. The method of claim 6, wherein the ferrule is expanded at regions surrounding each of the optical fibers, or at a central region encompassing the optical fibers, or along rail regions extending parallel to the optical fibers, or at pad regions, or at a region corresponding to all or a majority of an end face of the ferrule.

8. The method of claim 1, further comprising a step of applying an anti-reflective coating on an end of the optical fiber before or after laser processing.

9. The method of claim 1, wherein the ferrule has a polymeric construction.

10. The method of claim 1, wherein the ferrule has a material composition that includes polyphenylene sulfide.

11. A method for processing a multi-fiber ferrule for a multi-fiber optical connector, the multi-fiber ferrule having a distal end and a proximal end, the multi-fiber ferrule also defining a plurality of openings that extend through the multi-fiber ferrule from the proximal end to the distal end, the multi-fiber ferrule being adapted to support a plurality of optical fibers, the method comprising: inserting the plurality of optical fibers within the plurality of openings of the multi-fiber ferrule; securing the plurality of optical fibers in the plurality of openings of the multi-fiber ferrule using adhesive with stub ends of the plurality of optical fibers projecting beyond the distal end of the multi-fiber ferrule; cleaving the stub ends of the plurality of optical fibers; polishing the distal end of the multi-fiber ferrule and ends of the cleaved optical fibers; and laser processing the distal end of the multi-fiber ferrule to expand and increase a height of at least a portion or portions of the distal end of the multi-fiber ferrule such that distal ends of the plurality of optical fibers are recessed proximally with respect to the laser expanded portion or portions of the multi-fiber ferrule, wherein the laser expanded portion or portions extend between at least two of the plurality of openings.

12. The method of claim 11, further comprising applying an anti-reflective coating on the ends of the optical fibers after the laser processing.

13. The method of claim 11, wherein the laser is a laser suitable for expanding the multi-fiber ferrule by heating the multi-fiber ferrule.

14. The method of claim 11, wherein the multi-fiber ferrule is an MPO ferrule.

15. The method of claim 11, wherein the plurality of optical fibers are polished to bring tips of the optical fibers within plus or minus 5 microns of an end face of the distal end of the multi-fiber ferrule.

16. The method of claim 11, wherein a power level of the laser applied to the distal end of the multi-fiber ferrule is below an ablation threshold of a material of the multi-fiber ferrule.

17. The method of claim 11, wherein the multi-fiber ferrule has a polymeric construction.

18. The method of claim 11, wherein the multi-fiber ferrule has a material composition that includes polyphenylene sulfide.

19. The method of claim 1, wherein the laser processed portion extends to an edge of each the at least two fiber openings.

20. The method of claim 1, wherein the laser processed portion fully surrounds each the at least two fiber openings.

* * * * *